United States Patent
Hockett et al.

(10) Patent No.: US 10,204,030 B1
(45) Date of Patent: Feb. 12, 2019

(54) DEBUG SESSION TREE RECORDER WITH GENERIC PLAYBACK

(71) Applicant: International Business Machines Corporation, Armonk, NY (US)

(72) Inventors: Hugh E. Hockett, Raleigh, NC (US); Keith A. Rafferty, Wake Forest, NC (US); James C. Riordan, Raleigh, NC (US); Christopher M. Laffoon, Durham, NC (US); Giribabu V. Paramkusham, Morrisville, NC (US); Harish Sukhwani, Durham, NC (US); Nicholas C. Schambureck, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/727,670

(22) Filed: Oct. 9, 2017

(51) Int. Cl.
    G06F 11/36 (2006.01)

(52) U.S. Cl.
    CPC ...... *G06F 11/3636* (2013.01); *G06F 11/3624* (2013.01); *G06F 11/366* (2013.01)

(58) Field of Classification Search
    None
    See application file for complete search history.

(56) References Cited

U.S. PATENT DOCUMENTS

| | | | |
|---|---|---|---|
| 5,784,552 A * | 7/1998 | Bishop | G06F 11/3664 714/38.12 |
| 7,912,803 B2 | 3/2011 | Bodin et al. | |
| 2005/0132232 A1 * | 6/2005 | Sima | G06F 21/577 726/4 |
| 2006/0048098 A1 * | 3/2006 | Gatlin | G06F 11/321 717/124 |
| 2008/0141221 A1 | 6/2008 | Benesovska et al. | |
| 2011/0173239 A1 | 7/2011 | Sayed et al. | |
| 2011/0191676 A1 | 8/2011 | Guttman et al. | |
| 2015/0046909 A1 * | 2/2015 | Ligman | G06F 11/3688 717/131 |
| 2016/0124838 A1 * | 5/2016 | Feng | G06F 11/3636 714/38.13 |
| 2016/0203072 A1 | 7/2016 | Boxall et al. | |
| 2018/0173612 A1 * | 6/2018 | Law | G06F 11/3636 |

FOREIGN PATENT DOCUMENTS

WO   2016192174 A1   12/2016

* cited by examiner

Primary Examiner — Philip Wang
(74) Attorney, Agent, or Firm — Edward J. Wixted

(57) ABSTRACT

Specific example debugging sessions are used to generate a generic decision tree (flow diagram) for use in future debugging sessions. Debug metadata is recorded for each debugging session. The debug metadata includes log file accesses and key traces. A generic decision tree is generated for use in future debugging sessions. Each file accessed by a developer during debug sessions creates a node in the generic decision tree. Branches of the decision tree are created between the nodes by aggregating the plurality of debug sessions together based on similarities and differences among the file accesses and results for the various debug sessions. The recorded metadata is genericized by identifying specific actions taken by developers and specific results thereof. The actions and results are abstracted to create more general types of actions and results such that the generic decision tree is applicable to a wider variety of problems in the software program.

12 Claims, 3 Drawing Sheets

FIG. 4

US 10,204,030 B1

DEBUG SESSION TREE RECORDER WITH GENERIC PLAYBACK

BACKGROUND OF THE INVENTION

The present invention relates generally to the field of software debugging, and more particularly to automated debug processes and debug guidance.

Software debugging is a process of finding and correcting computer program errors or abnormal operation. Debugging is typically approached in a specific manner—for example, open log files, look for a set of key traces, then based on the result, open another log file, look for another set of key traces and so on. In a live debug session, the process may also include running diagnostic commands, or graphical user interface/representational state transfer (GUI/REST) operations, and then again examining log files or other output.

SUMMARY

According to an aspect of the present invention, there is a method, computer program product and/or system that performs the following operations (not necessarily in the following order): (i) recording debug actions, results and debug metadata for a first debugging session relating to a problems in a software program; (ii) genericizing a debug action to produce a genericized debug action; (iii) generating a generic decision tree based on the genericized debug action, results and debug metadata pertaining to the first debugging session; and (iv) automatically performing debug actions based on the generic decision tree, with respect to a second software problem, to identify a root cause of the second software problem. The debug metadata includes information pertaining to log file accesses and key traces conducted during the first of debugging session. At least one file accessed during a debug session creates a node in the generic decision tree.

DETAILED DESCRIPTION

Embodiments of the present invention provide a method to record debugging processes for specific problems, and merge such records from many debugging sessions, to automatically generate a reference resource, such as a flowchart and/or decision tree, that may assist an automated system and/or software analysts in subsequent debugging sessions.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
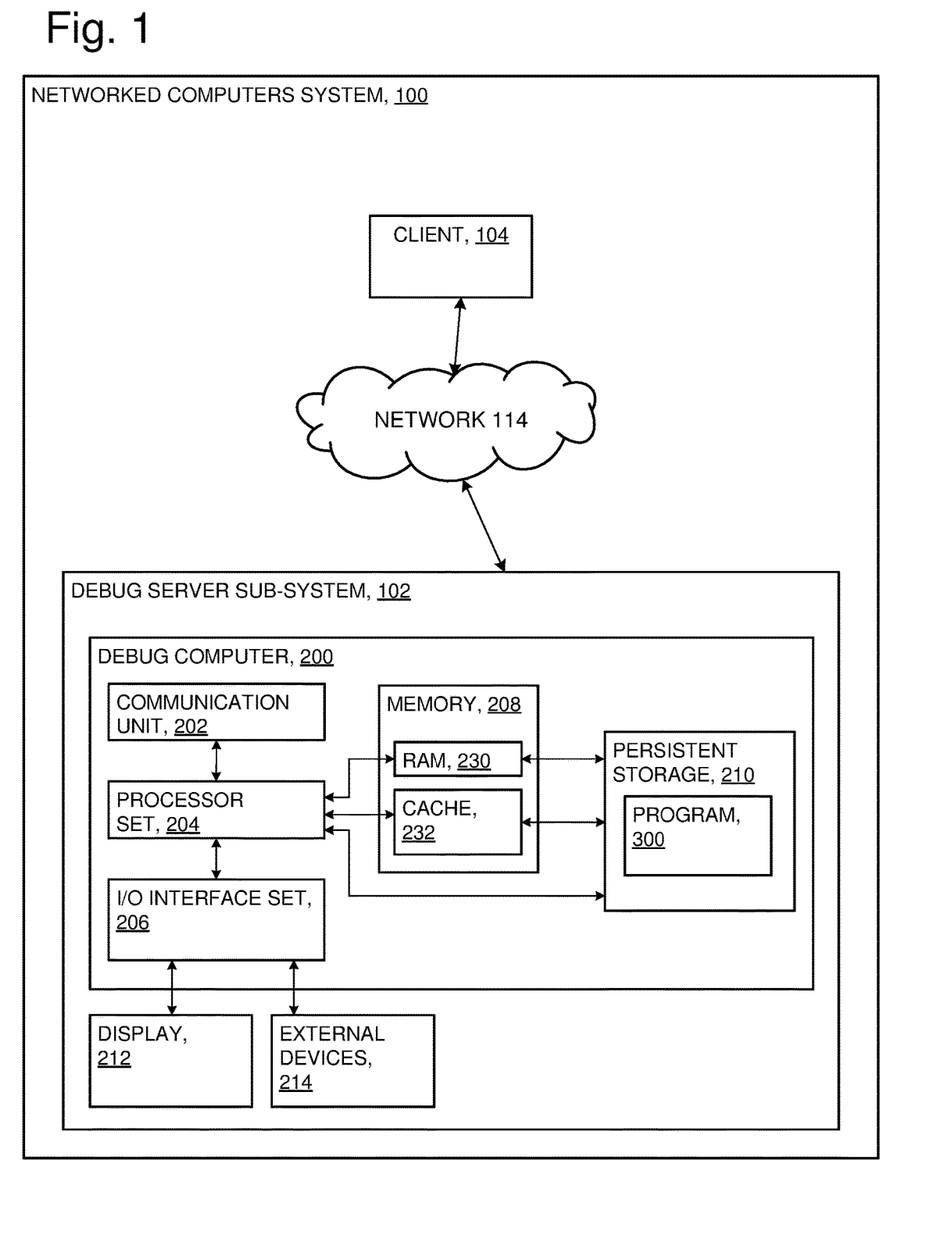
FIG. 1 is a functional block diagram showing a computing environment in accordance with at least one embodiment of the present invention.

An embodiment of a possible hardware and software environment for software and/or methods according to the present invention will now be described in detail with reference to the Figures. FIG. 1 is a functional block diagram illustrating various portions of networked computers system 100, including: debug server sub-system 102; client sub-system 104; communication network 114; debug computer 200; communications unit 202; processor set 204; input/output (I/O) interface set 206; memory device 208; persistent storage device 210; display device 212; external device set 214; random access memory (RAM) devices 230; cache memory device 232; and program 300.

Debug server sub-system 102 is, in many respects, representative of the various computer sub-system(s) in the present invention. Accordingly, several portions of debug server sub-system 102 will now be discussed in the following paragraphs.

Debug server sub-system 102 may be a laptop computer, tablet computer, netbook computer, personal computer (PC), a desktop computer, a personal digital assistant (PDA), a smart phone, or any programmable electronic device capable of communicating with the client sub-systems via communication network 114. Program 300 is a collection of machine readable instructions and/or data that is used to create, manage and control certain software functions that will be discussed in detail, below, in the Example Embodiment sub-section of this Detailed Description section.

Debug server sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Debug server sub-system 102 is shown as a block diagram with many double arrows. These double arrows (no separate reference numerals) represent a communications fabric, which provides communications between various components of debug server sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for debug server sub-system 102; and/or (ii) devices external to debug server sub-system 102 may be able to provide memory for debug server sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to debug server sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with debug computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
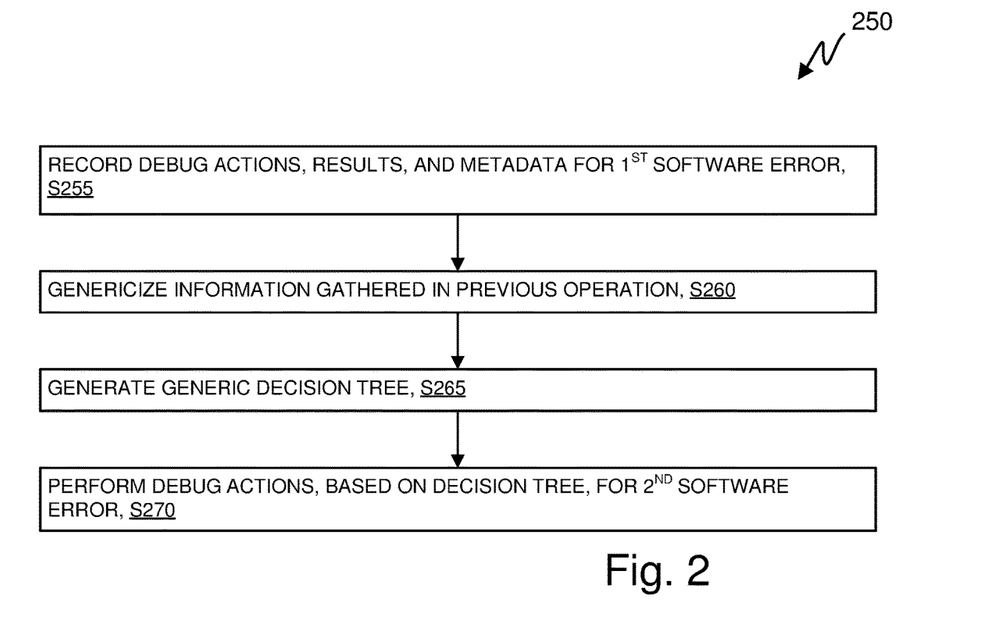
FIG. 2 is a flowchart showing a method performed, at least in part, in accordance with at least one embodiment of the present invention.
Figure 3:
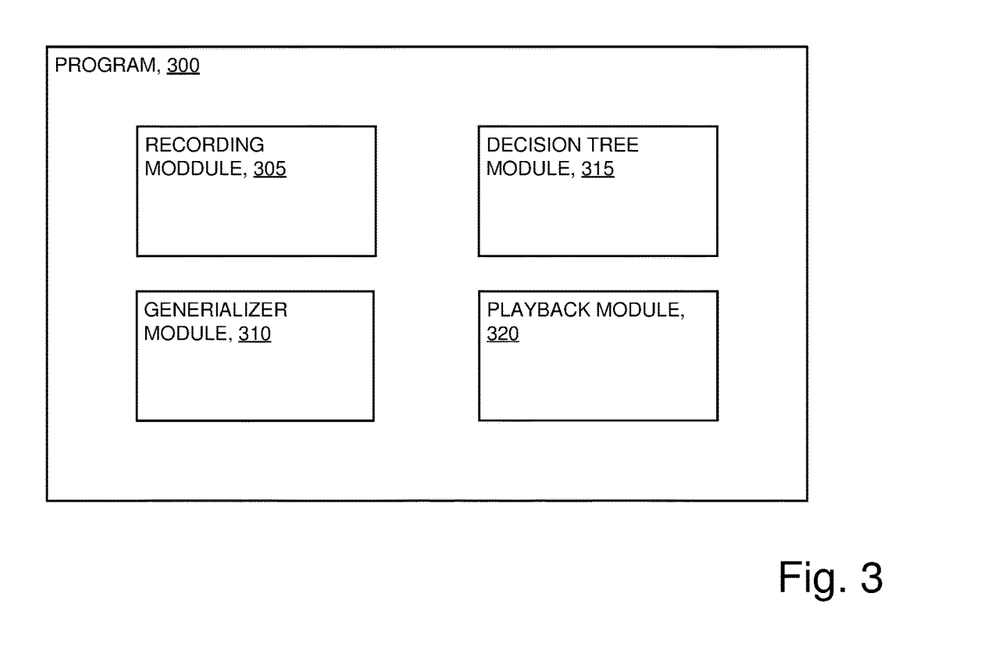
FIG. 3 is a block diagram showing a machine logic (for example, software) portion of a system in accordance with at least one embodiment of the present invention.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where recording module 305, of program 300, records debug actions taken, results obtained and metadata (entered by a user or automatically determined), for a software debugging session relating to a first software problem. The metadata includes information pertaining to log files accessed, and key traces conducted during the debug session. A key trace is any trace that is important and/or relevant to the debugging session.

Processing proceeds at operation S260, where generalizer module 310, of program 300, genericizes the information gathered in operation S255 above. For example, if a log file search included a search string equal to a software error code, the genericized search string treats the software error code as a variable. In a subsequent playback session for a new software error, the corresponding log file search string includes the new software error code in place of the variable. In another example, assume the log file search limited the search results to records that occurred within 5 seconds of the occurrence of the software error. In a subsequent playback session, the log file search will be similarly limited, based on the timestamp associated with the occurrence of the new software error.

Processing proceeds at operation S265, where decision tree module 315, of program 300 generates a generic decision tree, based on the information genericized in operation S260 above.

Processing proceeds at operation S270, where playback module 320 of program 300, replays the steps of the decision tree, to debug a new software problem and identify a root cause thereof. During playback, generic information stored in the decision tree is replaced with corresponding information specific to the new software problem being debugged.

III. Further Comments and/or Embodiments

Some embodiments of the present invention may include one, or more, of the following features, characteristics, and/or advantages: (i) creates a generic, annotated, "playbook tree"; and/or (ii) captures multiple developers' debugging processes as they debug a variety of problems. Each file the developer looks at, and each command the developer enters, creates a node in the tree. The branches on the tree are created automatically by aggregating multiple debug sessions together based on similarities and differences in each developer's searches and commands, and the results produced thereby.

During a debug session, a developer can have the tree: (i) automatically replayed; (ii) summarized for quick viewing; and/or (iii) generically replayed on alternate captured data sets and/or alternate live systems.

Some embodiments of the present invention may include one, or more, of the following features, characteristics, and/or advantages: (i) combines browser graphical user interface (GUI), command lines, log files, and manual annotations into a decision tree (sometimes herein referred to as a playbook tree or a playbook decision tree); (ii) generically records debug steps via either manual metadata entry, annotation, regular expression (regex) entry, or machine-learning; (iii) merges multiple debug sessions into a playbook decision tree containing branches for every alternate path that may have been recorded; (iv) provides a generic playback on alternate log collection sets, or on alternate live systems; (v) links this debug tree path down to the underlying defect in a source control system; (vi) an automatic playback feature recursively navigates up and down multiple paths in the playbook tree, based on content it sees (file contents, or command output, and/or webpage content); (vii) automatically applies common debugging strategies to new collection sets or alternate live systems; (viii) links an end-user's visible error to the full code flow in the logs; (ix) links an end-user's visible error to one or more underlying code defects; (x) captures, in the flow, knowledge of how to debug the defect and user impact, which can be saved, and linked to the defect in a defect tracking system; and/or (xi) grows the playbook tree over time, to hold the majority of known problems, where the playbook tree can be analyzed to determine impact of future code changes by highlighting common code paths, interactions, and problem areas (heat map); (xii) automatically generates debug investigation steps as a flowchart or tree; (xiii) automatically identifies known problems; and/or (xiv) enables a less skilled analyst (for example, a level 3 analyst) to investigate a software problem in a manner similar to that used by a more skilled analyst (for example a level 1 analyst).

Example Embodiment:

Consider a developer who is debugging a problem with the aid of a system contemplated by at least one embodiment of the present invention. The developer uses a trace log collection set and a live system. The developer navigates to multiple log files, noting important success and failure lines. On the live system, the developer runs additional commands, reviews command output, and views the live log files. The This entire process is captured in an annotated "playbook" with metadata associated with key output lines.

The expert developer then debugs another similar problem, also capturing the process in a second playbook.

The two captured playbook sessions are then merged into a "playbook tree" that branches based on specific errors lines found from each session.

A second unskilled developer now wants to debug a similar issue on a different trace log collection set. The unskilled developer replays the existing playbook, pointing it to the new data set. The playbook tree was stored in a generic way to easily replay the steps taken in the alternate data. The tool automatically opens a new collection set, and finds the relevant trace files and relevant trace lines.

Based on what is matched in the new collection set, the tool will follow appropriate branches in the tree.

For example, if this line shows error E123, open file X; if this line shows no error, then continue to the next key line or search term.

The tool displays the original trace lines and annotations alongside the new trace lines. The unskilled developer now has a side-by-side comparison to quickly find the similarities and differences in the two collection sets.

The tool also runs the same additional commands on the new system, and compares the output with the values from the playbook.

Over time, merging multiple debug sessions into a single playbook tree will encompass the debug steps for all known problems, and allow all known problems to be automatically detected.

A more detailed overview of aspects and/or methods in some embodiments of the present invention will now be discussed in the following paragraphs.

1. Capture a developer's entire debug session using an extension or plugin on a terminal window (or other user interface) for capturing important information such as: specific log files opened; important trace lines or segments noted; commands and output from secure shell handler (SSH) sessions; and/or actions taken in GUI sessions, representational state transfer application programming interfaces (REST APIs), or other tooling.

2. Developer denotes important pieces via user interface, such as: mouse highlight; gesture; eye movement; etc. Important pieces may include: success or failure lines; links to existing problem management records or defects; links to other logs or useful data; and/or screen captures or specific GUI elements.

3. Developer enters (via typing or speaking, for example) additional annotations specific to the currently viewed data. One, of many example annotations, might be an explanation of the trace line.

4. Developer and/or automated machine learning system (algorithm) captures and parses log lines or other output and converts the data into important pieces, such as metadata and regular expressions (regex), to store both the original data and a generic metadata-based representation. For example, in some embodiments, a developer or automated system parses this example log line "20161024 09:10:30 Error CWZIP1234 Error pattern MyPattern failed" into the following important pieces: Converted metadata line: {timestamp: "20161024 09:10:30", exact-match: "Error CWZIP1234", important data: "MyPattern", user-annotation: "This is often caused by . . . "}. The algorithm pulls out the exact match, and remembers the timestamp and important data. It uses this data to determine where to look next. Given multiple similar log collection sets, this metadata can be machine-learned based on regex of known items. That is, timestamps can be automatically detected as a timestamp, or known error message keys can be automatically flagged as such.

5. Ability to replay the entire session, important parts, or a summary of the debug session as animation, slide show, or flow chart. With respect to a replay, the developer may add or alter the metadata mappings to improve the generic playback. This is replaying a single path down the tree.

6. Ability to abstract the captured session into a generic session that can be replayed on a different data set (alternate log collection, or alternate live system). This is achieved through metadata based searching. This aspect is discussed in further detail below, in the section "Detail on Abstracting the Data"

7. Ability to merge multiple debug sessions into a decision tree based on parsed data. Example: "I see an error A, so I look at log X"; but next time "I see an error B, so I look at log Y".

8. Tree branches and paths may depend on the version of the product code. Some branches/nodes apply to multiple versions. Ability to link a known defect or code change record to a node in the tree—linking resolution information to the tree node. This ability, for example, lets a user see that a known defect applies to, say, v2.0 and below; or this issue was fixed in v3.0. For automatic playback, if the product is on version 2.0, then this tree path should be considered (or skipped if the defect was fixed in that version).

9. Ability to generically "live-mirror" an in progress session on a similar alternate data set; or alternate live system. The live mirror would allow a stepping playback that automatically branches based on the best match found in the user's current data set or live system output. Example 1: I'm viewing these trace logs, and I want compare them with the same logs in a known-good collection set in real-time. Example 2: I'm viewing these trace logs and I want to see if this is the same error as this other known problem.

10. Ability to recursively walk down multiple tree branches during playback to allow multiple problems to be discovered in the same collection set or live system.

11. Ability to step-walk both up and down the tree during playback—can move forward and backwards during playback, repeating steps as needed.

12. Automatically processes all of the matching branches in case of multiple matching branches, and gives a summary to the user with links to the details. On manual step-through playback, the user can see the branch summary (quick view) before deciding to navigate down to the details.

13. Saves specific tree path (or multiple paths) along with the defect, in the defect tracking system. This allows: (i) easy debugging and automatic detection in the future; and (ii) linkage of the tree paths to code changes, and version specific bugs.

Detail on Abstracting the Data:

Some embodiments of the present invention may include one, or more, of the following features, characteristics, and/or advantages: (i) generally abstracts away data that is specific to a machine, to allow for comparison between common pieces of output; (ii) pre-creates filters that map data to the metadata, to provide the ability to detect what data to abstract, what data to ignore, convert, fuzzy match, or save for exact match within the collection set; and/or (iii) enables a user to create filters "on the fly" while looking at the data.

Examples:

System parses trace lines with timestamps, and converts the timestamps into relative time for "fuzzy" (similar) matches (for example, a first important trace line must have been written between 0 and 5 seconds before a second important line, for the first line to be considered significant)

System converts file names containing timestamps into relative time (day 0, day 1, etc.) such that logs from two machines can be generically matched based on the timestamp names.

System intelligently ignores (or maps to one or more common regular expressions (regex)) trace lines (or log file names) with unique identifiers, unique internet protocol addresses (IP addresses), thread numbers, and customer data. System remembers the original data for exact matching within the same data set.

1.0 Example 1:

The system determines that given element in a given line of a log file is a thread number. The next line of interest in the log file, therefore, must include this thread number.

2.0 Example 2:

The system determines that a given element in a first log is a pointer to a second log. The second log will have this name in this collection set. In metadata, this is saved as a pointer reference to be followed generically in another collection set.

2.1 User Notes this Trace Line in Log.Txt:
"Sending output to: /tmp/myCommand123.txt".
2.2 Metadata Generated:
{
"filename": "/tmp/log.txt", // This is the exact file name where we are searching.
"important-line: "Sending output to: /tmp/myCommand123.txt", // This is the exact full text of the original line we are interested in "exact-match": "Sending output to:", // This is a part of the original text that we need to match exactly
"#reference-file-within-collecitonset-1": "/tmp/myCommand123.txt"// This defines a variable that references a file name defined in this collection set to be generically used for other sets.
}

2.3 User Action:
Open/tmp/myCommand123.txt, and search for "ERROR"
2.4 Metadata Generated:
{
"filename": "#reference-file-within-collecitonset-1", //We are searching in this file—Note this is the variable referencing the file defined previously
"exact-match": "ERROR"// This is the exact text we should search for
}

Creating, and programmatically using the tree, in some embodiments of the present invention, are very similar processes. In creating the tree, a user takes actions based on pre-existing knowledge of a skilled developer or analyst. The system records the actions taken (generating nodes and branches), and the user annotates the generated nodes and branches as needed. For programmatically using the tree, the system takes actions based on the branches and nodes and metadata in the existing decision tree.

Recording Session.

Figure 4:
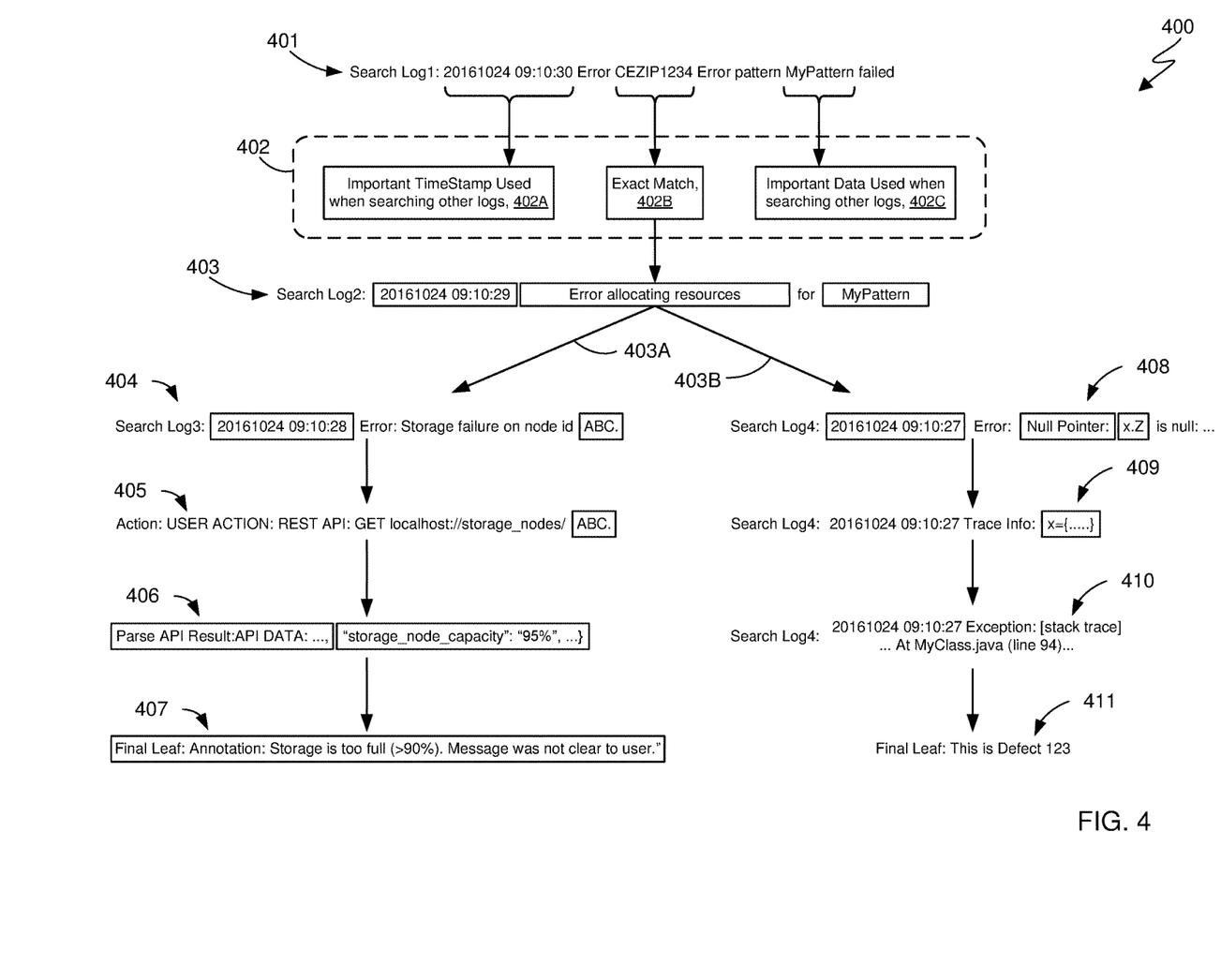
FIG. 4 is an example of a debug process followed in accordance with at least one embodiment of the present invention.

An example debugging scenario will now be given, to illustrate a debug process and creation of a decision tree, in some embodiments of the present invention, with reference to debug process 400 of FIG. 4. For clarity in this description, the term "recorder" refers to a recording function provided in some embodiments of the present invention.

A user starts with a report of a system error thrown by a particular software application, having an error code of "CEZIP1234", a log collection set and access to a live system to debug. The user starts the "recorder", opens Log1, and searches for a known error code: "CEZIP1234" (401). Upon finding the matching line (401), the user tells the recorder that this line (401) is important. The user enters metadata in the recorder describing important data elements in the matching line as follows: (i) "Important TimeStamp used when searching other logs" (402A), to be stored in the recorder's metadata both in the absolute format, and as a relative timestamp format; (ii) "Exact Match" with respect to the text that was searched for ("CEZIP1234") (402B); and (iii) "Important data used when searching other logs" (subtext "MyPattern") (402C) and a generated regular expression (regex) pattern (not shown in the Figures), used to extract the subtext from the line. A first node in the decision tree comprises the aforementioned elements (401, 402A, 402B, and 402C).

Having seen the error in log line 401, the user knows to open "Log2", and search for an occurrence of "MyPattern" (based on metadata 402C recorded in the first node) that may have occurred at a time shortly before (in this example, a few seconds before 20161024 09:10:30) the timestamp associated with the first node. The recorder creates a second node with metadata in the tree based on this user action (performing the search).

The search returns line 403. The recorder links the search text ("MyPattern") which becomes linked metadata. The recorder also saves the relative timestamp. The user can add additional metadata corresponding to the timestamp (if, for example, there happened to be strict timestamp matching constraints such as "must be within 0-30 seconds before first node's timestamp"). The user then sees "Error Allocating Resources" in line 403, and adds metadata to the second node in the recorder specifying "Error Allocating Resources" as an exact text match.

At this point, there are two possible reasons for the error: (i) "storage failure"; and (ii) "null pointer". The logs will contain either line 404, line 408, or both.

The user opens Log3, and searches through lines that are timestamped slightly before the first node's timestamp, and that contain the string "Error". A match is found (line 404) and in response, the recorder creates a third node. (If the match were not found, the user would continue searching in Log4 (408) discussed below.) The user enters metadata into the recorder that notes the important parts of the line as follows: (i) timestamp—stored as a relative timestamp format, with possible time constraints; (ii) the exact text "Error: Storage failure on node id"; (iii) the important subtext "ABC"; and (iv) a generated regex pattern used to extract the subtext from the line.

(405) The user opens a command window and runs a command to test the live system. The recorder creates a fourth node comprising the following information: (i) this is a command to be run; (ii) the actual command; and (iii) the linked metadata item "ABC" as a variable input.

(406) The user reads the output of the command, and looks for a specific section "storage_node_capacity". Upon finding it, the user sees the associated value ("95%").

The recorder creates a fifth node for processing the output, with metadata specifying the following: (i) this is a command line output parsing; (ii) parsing is in JavaScript object notation (JSON) format; (iii) the text to exactly match: "storage_node_capacity"; and (iv) the important subtext (parsed by JSON): "95%".

(407) The user knows that this is a known error condition, and creates a sixth node in the recorder with additional metadata as follows: (i) "node is triggered if the previous node important subtext>90%"; and (ii) the node's annotation is "Storage is too full (>90%). Message was not clear to user."

At this point a root cause is found and the user is finished. All steps taken so far, needed to determine root cause, have been recorded as nodes (in this case the first node through the sixth node) in the decision tree.

If the search described in (404) did not find a match, then the user continues at 408. The user may continue at 408 even if the search described in (404) found a match, as there may often be multiple errors.

The general process of creating nodes and specifying important items in metadata is the same as above with respect to branch 403A. Therefore, for branch 403B, the following discussion is a brief summary.

(408) The user searches "Log4" for a log entry containing the string "Error" having occurred within a few seconds of the previous node's timestamp. The user notes the error text as important. A match is found (408) and the recorder, in response, creates a node with the relevant metadata: "x.Z"

(409) The user searches the same Log4, within a few lines above or below the location of line 408, for a specific sub-part of the metadata. The metadata here includes the following: (i) some number of lines in the log before the error (within 10 lines, as noted by the user); (ii) the first part of the previous node metadata: "x.Z" which is converted to "x"—based on regex confirmed by the user; and (iii) the matching "Trace Info" line with "x=".

(410) The user notes the stack trace here—search string "stack trace". The user further notes the lines below the stack trace contain "MyClass.java (line 94)".

(411) The user links the final leaf node to a known defect "123", meaning that if all previous nodes (see 401, 402, 403, 408, 409, 410) are matched, then this is defect "123".

The matching metadata and nodes are then linked in the defect details.

In general, each final leaf is tied to the chain of log entries, API results, or command line calls above it. In the case of a known defect, this chain of debug playbook steps can be saved with the defect in the defect tracking system.

Some final leaves may be a more generic error match (.*Error.*), and will still assist in debug, even if the problem is not yet known.

Playback Session.

Another example of a debugging scenario, similar to the example given above in the section "Recording session", will now be given, except that this time, the example demonstrates fully automated playback, or automated playback with user interaction, based on the decision tree created above in the recording session. For clarity in this description, the term "player" refers to a playback function provided in some embodiments of the present invention.

The debug session is triggered with a report of a system error thrown by a particular software application, having an error code of "CEZIP1234". Information provided to the user and the automated debug system includes the error code (CEZIP1234), the decision tree created above, a log collection set and access to a live system to debug. The player starts playback of the decision tree. Following the steps that are recorded in the decision tree, the player, opens Log1, and searches for a known error code: "CEZIP1234" (401). Upon finding the matching line (401), the player knows this line (401) is important due to the annotations created previously (402). The player refers to following information recorded in the first node of the decision tree: (i) "Important TimeStamp used when searching other logs" (402A); (ii) "Exact Match" with respect to the text that was searched for ("CEZIP1234") (402B); and (iii) "Important data used when searching other logs" (subtext "MyPattern") (402C) and a generated regular expression (regex) pattern (not shown in the Figures), used to extract the subtext from the line.

Having found the error in log line 401, the player, by reference to 401 and 402, knows to open "Log2", and search for an occurrence of "MyPattern" (metadata from the first node) that may have occurred at a time shortly before (in this example, a few seconds before 20161024 09:10:30) the timestamp associated with the first node.

The search returns line 403. The player refers to the linked metadata to determine the search text ("MyPattern") and any timestamp matching constraints such as "must be within 0-30 seconds before first node's timestamp". The player finds "Error Allocating Resources" in line 403, based on metadata in the second node "Error Allocating Resources" as an exact text match.

At this point, there are two possible reasons for the error: (i) "storage failure"; and (ii) "null pointer". The logs will contain either line 404, line 408, or both.

The player opens Log3, and searches through lines that are timestamped slightly before the first node's timestamp, and that contain the string "Error". A match is found (line 404). (If the match were not found, the player would continue searching in Log4 (408) discussed below.) The player refers to metadata that notes the important parts of the line as follows: (i) timestamp—stored as a relative timestamp format, with possible time constraints; (ii) the exact text "Error: Storage failure on node id"; (iii) the important subtext "ABC"; and (iv) a generated regex pattern used to extract the subtext from the line.

(405) The player opens a command window and runs a command (or directs the user to open the command window and run the command) to test the live system, referring to data in the fourth node comprising the following information: (i) this is a command to be run; and (ii) the actual command; and (iii) the linked metadata item "ABC" as a variable input.

(406) The player reads the output of the command, and looks for a specific section "storage_node_capacity". Upon finding it, the player sees the associated value ("95%").

The player refers to metadata in the fifth node for processing the output, the metadata specifying the following: (i) this is a command line output parsing; (ii) parsing is in JavaScript object notation (JSON) format; (iii) the text to exactly match: "storage_node_capacity"; and (iv) the important subtext (parsed by JSON): "95%".

(407) The player refers to the sixth node including additional metadata as follows: (i) "node is triggered if the previous node important subtext>90%"; and (ii) the node's annotation is "Storage is too full (>90%). Message was not clear to user."

At this point, a root cause is found and the player informs the user of the result. All steps needed to determine root cause have been automatically replayed with reference to the nodes (in this case the first node through the sixth node) in the decision tree.

If the search described in (404) did not find a match, then the player continues at (408). The player may continue at 408 even if the search described in (404) found a match, as there often may be multiple errors.

The general process of replaying the process of stepping through the nodes and reading important items in metadata is the same as above with respect to branch 403A. Therefore, for branch 403B, the following discussion is a brief summary.

(408) The player searches "Log4" for a log entry containing the string "Error", and having occurred within a few seconds of the previous node's timestamp. The player sees the error text is noted as important. A match is found (408) and the player refers to the node to determine the relevant metadata: "x.Z"

(409) The player searches the same Log4, within a few lines above or below the location of line 408, for a specific sub-part of the metadata. The metadata here includes the following: (i) some number of lines in the log before the error (within 10 lines, as noted by the user); (ii) the first part of the previous node metadata: "x.Z" which is converted to "x"—based on regex confirmed by the user; and (iii) the matching "Trace Info" line with "x=".

(410) The player notes the stack trace here—search string "stack trace". The player further finds the lines below the stack trace contain "MyClass.java (line 94)".

(411) The player determines all previous nodes (see 401, 402, 403, 408, 409, 410) are matched, and in response issues the conclusion embodied in the final leaf node.

Some embodiments of the present invention may include one, or more, of the following features, characteristics, and/or advantages: (i) a method for using specific example debugging sessions to generate a generic decision tree (e.g., flow diagram) for use in future debugging sessions; (ii) recording debug metadata for each debugging session of a plurality of debugging sessions, relating to a variety of problems in a software program, wherein the debug metadata includes log file accesses and key traces during each debugging session; (iii) generating, based on an analysis of the recorded debug metadata, a generic decision tree for use in future debugging sessions.

Each file accessed by a developer during, one of the debug sessions creates a node in the generic decision tree. Branches of the decision tree are created between the nodes by aggregating the plurality of debug sessions together based on similarities and differences in each developer's file accesses and results. The recorded metadata isgeneralized, to produce generalized metadata, sometimes herein referred to as genericized metadata, by: (i) identifying specific actions taken by developers and specific results resulting from those actions; and (ii) abstracting those actions and results to more general types of actions or results such that the generic decision tree has wider applicability to more problems in the software program.

Some embodiments may not have the potential advantages disclosed herein, and these potential advantages are not necessarily required of all embodiments.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for generating and playing back a decision tree for use in software debugging sessions, the method comprising:
    recording debug actions, results and debug metadata for a first debugging session relating to a problem in a software program, wherein the debug metadata includes information pertaining to log file accesses and key traces conducted during the first of debugging session;
    genericizing a debug action to produce a genericized debug action;
    generating a generic decision tree based on the genericized debug action, results and debug metadata pertaining to the first debugging session; and
    automatically performing debug actions based on the generic decision tree, with respect to a second software problem, to identify a root cause of the second software problem;
    wherein at least one file accessed during a debug session creates a node in the generic decision tree.

2. The method of claim 1, further comprising:
    aggregating a plurality of debug sessions together, based on similarities and differences in file accesses and results corresponding to the plurality of debug sessions, to produce branches of the generic decision tree.

3. The method of claim 1, further comprising:
    identifying a specific action taken by a user with respect to debugging a software error;
    producing a specific result based on the specific action;
    abstracting the specific action and the specific result to produce genericized metadata; and
    recording the genericized metadata in the generic decision tree.

4. The method of claim 1, wherein the debug metadata includes at least one of:
    a debug step taken;
    an annotation made with respect to a search result;
    an annotation identifying a debug step taken
    a regular expression;
    a search string;
    a pointer reference to a log file;
    a file name; and
    a variable that references a file name defined in a collection set to be generically used for other collections sets.

5. A computer program product comprising:
    one or more computer readable storage media and program instructions stored on the one or more computer readable storage media, the program instructions comprising instructions to perform:
    recording debug actions, results and debug metadata for a first debugging session relating to a problem in a software program, wherein the debug metadata includes information pertaining to log file accesses and key traces conducted during the first of debugging session;
    genericizing a debug action to produce a genericized debug action;
    generating a generic decision tree based on the genericized debug action, results and debug metadata pertaining to the first debugging session; and
    automatically performing debug actions based on the generic decision tree, with respect to a second software problem, to identify a root cause of the second software problem;
    wherein at least one file accessed during a debug session creates a node in the generic decision tree.

6. The computer program product of claim 5, further comprising instructions to perform:
    aggregating a plurality of debug sessions together, based on similarities and differences in file accesses and results corresponding to the plurality of debug sessions, to produce branches of the generic decision tree.

7. The computer program product of claim 5, further comprising instructions to perform:
    identifying a specific action taken by a user with respect to debugging a software error;
    producing a specific result based on the specific action;
    abstracting the specific action and the specific result to produce genericized metadata; and
    recording the genericized metadata in the generic decision tree.

8. The computer program product of claim 5, wherein the debug metadata includes at least one of:
    a debug step taken;
    an annotation made with respect to a search result;
    an annotation identifying a debug step taken
    a regular expression;
    a search string;
    a pointer reference to a log file;
    a file name; and
    a variable that references a file name defined in a collection set to be generically used for other collections sets.

9. A computer system comprising:
    one or more computer processors;
    one or more computer-readable storage media;
    program instructions stored on the computer-readable storage media for execution by at least one of the one or more processors, the program instructions comprising instructions to perform:
    recording debug actions, results and debug metadata for a first debugging session relating to a problem in a software program, wherein the debug metadata includes information pertaining to log file accesses and key traces conducted during the first of debugging session;
    genericizing a debug action to produce a genericized debug action;
    generating a generic decision tree based on the genericized debug action, results and debug metadata pertaining to the first debugging session; and automatically performing debug actions based on the generic decision tree, with respect to a second software problem, to identify a root cause of the second software problem;

wherein at least one file accessed during a debug session creates a node in the generic decision tree.

10. The computer system of claim 9, further comprising instructions to perform:

aggregating a plurality of debug sessions together, based on similarities and differences in file accesses and results corresponding to the plurality of debug sessions, to produce branches of the generic decision tree.

11. The computer system of claim 9, further comprising instructions to perform:

identifying a specific action taken by a user with respect to debugging a software error;

producing a specific result based on the specific action;

abstracting the specific action and the specific result to produce genericized metadata; and recording the genericized metadata in the generic decision tree.

12. The computer system of claim 9, wherein the debug metadata includes at least one of:

a debug step taken;

an annotation made with respect to a search result;

an annotation identifying a debug step taken a regular expression;

a search string;

a pointer reference to a log file;

a file name; and a variable that references a file name defined in a collection set to be generically used for other collections sets.

* * * * *